United States Patent [19]

Bienvenu et al.

[11] Patent Number: 4,501,226

[45] Date of Patent: Feb. 26, 1985

[54] DISPOSABLE PET LITTER CONTAINER

[76] Inventors: Gerald A. Bienvenu; E. Gayle Bienvenu, both of 208 State St., Newburgh, Ind. 47630

[21] Appl. No.: 593,585

[22] Filed: Mar. 26, 1984

[51] Int. Cl.³ .......................... A01K 23/00; B65D 5/22
[52] U.S. Cl. ........................................... 119/1; 229/38
[58] Field of Search .............. 119/1; 229/44 R, 39 R, 229/37 E, 38

[56] References Cited

U.S. PATENT DOCUMENTS

| | | | |
|---|---|---|---|
| 2,451,644 | 10/1948 | Wood | 229/39 R |
| 3,935,992 | 2/1976 | Uriu | 229/38 |
| 4,164,314 | 8/1979 | Edgar | 119/1 X |
| 4,271,787 | 6/1981 | Wellman et al. | 119/1 |
| 4,305,544 | 12/1981 | Noonan | 119/1 X |

Primary Examiner—Hugh R. Chamblee
Attorney, Agent, or Firm—Woodard, Weikart, Emhardt & Naughton

[57] ABSTRACT

A disposable pet litter container characterized by a bottom wall, and side and end walls, where lower portions of the latter are arranged with the bottom wall to define a litter receiving receptacle, and other upper portions are selectively foldable to present either a fully assembled unit or to serve in a covering relationship for the receptacle. The upper portions of the side and end walls angle inwardly, where other upper portions of the side walls depend downwardly and inwardly, combining to minimize unwanted litter passage from the container and, at the same time, to achieve assembly. The container is integral, made from foldable material, and with the application of a moisture impervious coating, either before or after assembly, stops any liquid pet waste seepage.

8 Claims, 6 Drawing Figures

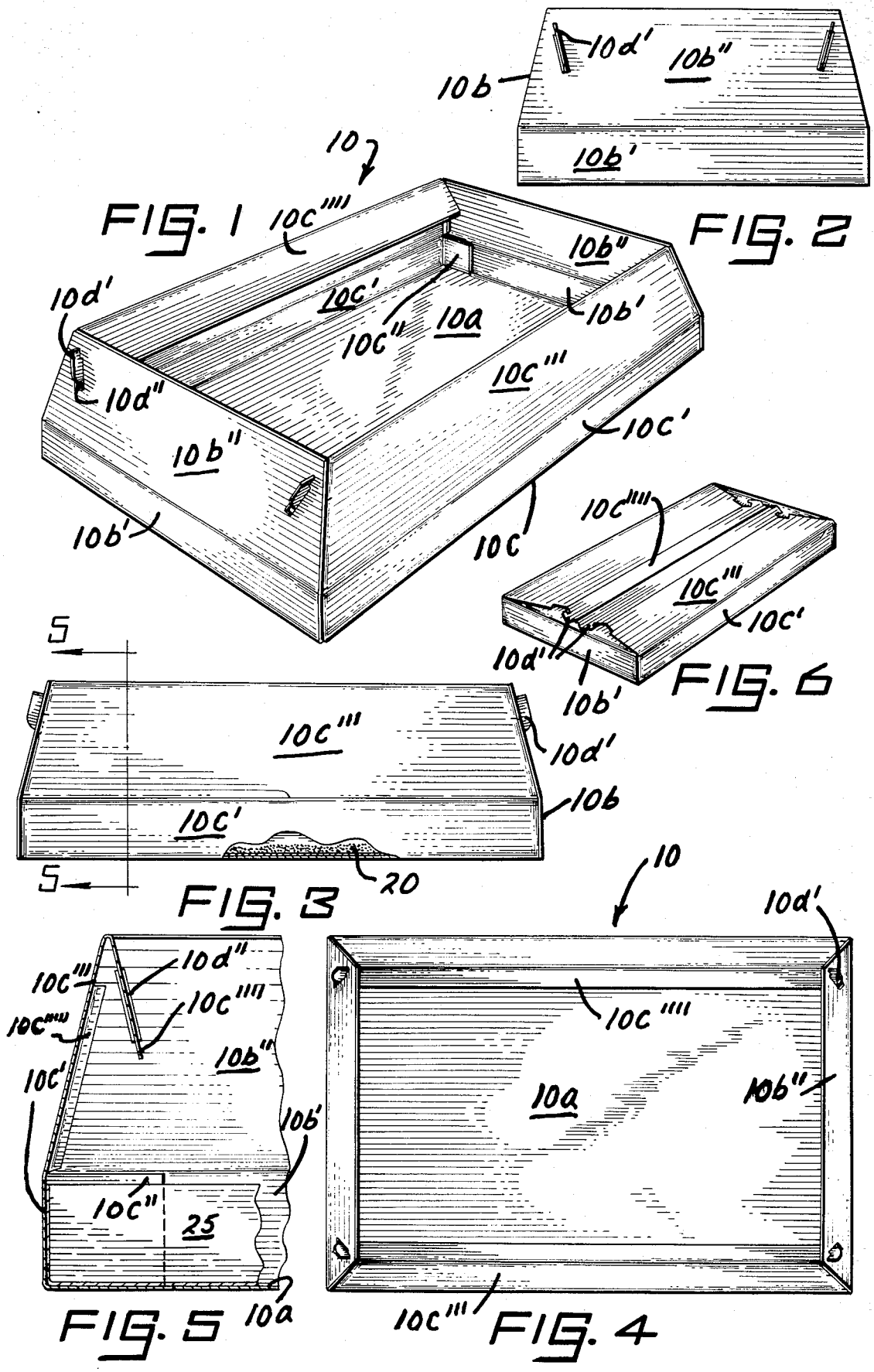

DISPOSABLE PET LITTER CONTAINER

As is known, pet owners have an on-going problem in collecting and disposing of their pet's solid and liquid body waste in a sanitary and yet convenient manner. Although, presently, reusable containers, as well as various procedures for handling the collected waste, are available, such generally involve undesirable assembling and/or unpleasant maintenance for the pet owner, aside from the possibility of exposure to harmful bacteria.

Many of the disposable litter boxes, trays or the like now in use are ineffective and/or disadvantageous for one reason or another, as, for example, in the instance of a plastic liner for a paperboard container, the puncturing and/or tearing of the liner by the pet before and after voiding permits leakage of waste matter onto the container, resulting in a soggy litter box, soiled floors and/or carpeting, and the like; with a wax-coated paperboard blank which is subsequenty folded so as to form a tray, the possibilities of leakage, at the corners, for example, is prevalent; and, litter boxes and like devices having vertical and/or outwardly slanting walls prove unsatisfactory because the pet, in pawing and scratching the litter material, will most likely scatter such over the sides of the box and, thereby, soil the surrounding area. On the other hand, presently available pet litter boxes are inherently complex to assemble, inhibiting consumer purchase.

The pet litter container of the invention overcomes the aforestated objections by presenting a disposable receptacle which (1) is both inexpensive and readily assembled into final pet usage form by the purchaser; (2) affords complete containment of any liquid waste matter; (3) includes inwardly slanting side wall portions which serve as an anti-scattering measure, i.e. prevent litter passage over the edges of the container during usage; (4) provides side walls for the container which each have an inwardly and downwardly inclined folded portion therealong; and, (5) requires, for assembly after purchase, only folding and the fastening of four tabs, i.e. represents simplicity.

The disposable pet litter container presented herein is customarily used in association with prepackaged cat litter material, where the latter is typically included as part of the total purchased item. Moreover, not only is the container easily folded from a marketed partly assembled boxlike condition for pet use, but, after use, may be refolded into the boxlike (and covered) form for ready disposal. In addition, the container affords a pleasant appearing commercially packaged unit at the purchase site, and, as well, is unobtrusive when at a use location, as, for example, within a home.

In any event, a better understanding of the present invention will become more apparent from the following description, taken in conjunction with the accompanying drawing; wherein FIG. 1 is a perspective view of a disposable pet litter container, after full assembly for use, in accordance with the teachings of the present invention;

FIG. 2 is a view in end elevation of the pet litter container at hand;

FIG. 3 is a view in side elevation, looking from right to left in FIG. 2, and partially fragmentary to reveal pet litter material;

FIG. 4 is a top plan view of the invention after full assembly;

FIG. 5 is a view in vertical section, taken at line 5—5 on FIG. 1 and looking in the direction of the arrows, further detailing the invention; and, FIG. 6 is another perspective view, but in reduced scale, showing the instant pet litter container in a marketed condition and/or in a condition for disposal.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the disposable pet litter container of the invention is typically made from a precut blank, preferably with associated fold lines (either scored or printed, for example), of paperboard, cardboard or similar foldable material with generally rigid physical properties and/or characteristics. At the outset, the instant container 10, when purchased and/or when later disposed of after pet usage, assumes the condition illustrated in FIG. 6, i.e. is in a partially closed or covered boxlike form.

Basically, the container 10 of the invention is characterized by a bottom wall 10a which presents, by reason of fold lines, end walls 10b and side walls 10c. As apparent in FIGS. 1, 2, 3 and 6, for example, lower portions 10b' of each end wall 10b and lower portions 10c' of each side wall 10c are disposed in a generally vertical plane, where tabs or flaps 10c" (only one of which is shown in FIG. 1, but also see FIG. 5) extend from lower portions 10c' of side walls 10c at each of the corners, overlapping the lower portions 10b' of the end walls 10b and adhesively secured thereto.

As further evident in the figures, upper portions 10b" of end walls 10b and upper portions 10c''' of side walls 10c, when folded and/or assembled, taper inwardly. Such tapering serves to prevent, or at least minimize, passage of loose pet litter material 20 (representatively shown in FIG. 3) covering the bottom wall 10a of container 10 over the end walls 10b and the side walls 10c during pet usage.

In any event, and to achieve a rigid assembled container 10, the side walls 10c include (also defined by fold lines) inwardly and downwardly angling portions 10c''''. As particularly evident in FIGS. 1 and 5, each of the aforesaid portions 10c'''' present, at opposite ends, integral locking tabs 10d', where the latter are selectively received in cooperating slots or like openings 10d" disposed in the upper portions 10b" of the end walls 10b. The container 10 may also include auxiliary corner tabs 10c''''' to insure further litter containment (see FIG. 5). In other words, positive assembly is afforded for usage from the initial marketed or purchased condition of FIG. 6.

In a preferred form of the invention, and as mentioned hereabove, the bottom wall 10a of container 10 receives pet litter material 20, spread into a more or less uniform depth. In order to assure liquid tightness, i.e. to prevent liquid waste flow, the bottom wall 10a and parts of the lower portions of the end and side walls 10b and 10c, respectively, inside the container 10 are coated with a wax or other moisture impervious material 25, after partial container assembly, i.e. into the form of FIG. 6 (by the manufacturer), reaching into the lower corners of the container 10 and to any desired height, such as that typically shown in FIG. 5. In the alternative, a precoated paperboard or cardboard blank may be employed to achieve similar end results.

Restated otherwise, the pet litter container 10 is preferably made available to the consumer in the partially assembled form of FIG. 6, but the moistureproofing is previously accomplished by either a wax application onto the bottom wall 10a and the lower portions 10b' and 10c', including tabs or flanges 10c'', of the end and side walls 10b and 10c, respectively, after preliminary assembling, or by the use of fully precoated blank material.

In use, and as stated, the disposable pet litter container 10 presented herein is preferably purchased in the form shown in FIG. 6, i.e. where the bottom wall 10a and the lower portions 10b' and 10c' of the end and side walls 10b and 10c, respectively, are already preassembled (through folding and the positioning of flaps 10c''). As an alternative, and particularly in the instance of a precoated blank, the purchaser could assemble the entire unit.

In any event, through a succession of folding steps, including fastening, at 10d''-10d''', accomplished with some wall or panel portions flexing or the like on the part of the purchaser, the container 10 of FIGS. 1, 2, 3 and 4 results. The pet litter material 20, typically sold prepackaged with the unit, is spread onto the bottom area of the receptacle and, accordingly, a pet usage structure then exists. After pet waste matter has accumulated, the reverse of the preceding assembly procedure takes place, where, again, the container 10 assumes the covered FIG. 6 condition awaiting ready disposal.

The benefits of the invention are obvious, overcoming the objections and/or shortcomings of the arrangements presently in use. The disposable pet litter container described above is, of course, susceptible to various changes within the spirit of the invention including, for example, the use of different foldable fabricating materials; changes in proportioning, i.e. the plan configuration of the container could be square rather than rectangular as shown; the recited wall portions securing and interconnecting means could be modified or substituted; and, the like.

Thus, the preceding description should be considered illustrative and not as limiting the scope of the following claims.

We claim:

1. A container for receiving pet litter material comprising:

in an integral folded relationship, a bottom wall, side walls and end walls, said side and said end walls having lower portions and upper portions, means securing said lower portions of said side and said end walls together, other portions depending from said upper portions of said side walls and angling downwardly and inwardly towards each other, said lower portions of said side and said end walls extending upwardly in a generally vertical plane with respect to said bottom wall, said upper portions of said side walls and said upper portions of said end walls angling inwardly towards each other, and means interconnecting said other portions of said side walls with said upper portions of said end walls in a selectively assembled relationship, said interconnecting means including said upper portions of said end walls including pairs of slots and said other portions of said side walls including tabs extending within and secured to the slots of said upper portions of said end walls.

2. The container of claim 1 wherein a moisture impervious coating is disposed on said bottom wall and at least a part of said lower portions of said side and said end walls.

3. The container of claim 1 where said upper portions of said side and said end walls and said other portions of said side walls selectively overlie said bottom wall in a fully covering relationship.

4. The container of claim 1 in which said side walls further include flaps extending outwardly of the upper portions of said side walls and overlapping said upper portions of said end walls.

5. The container of claim 1 where said securing means are flaps extending from certain of said lower portions in an overlapping fastened relationship with other of said lower portions.

6. The container of claim 5 where adhesive means maintain said overlapping fastened relationship.

7. A kit for the provision of pet litter material within a container comprising:

a package of pet litter material; and a container including in an integral folded relationship, a bottom wall, side walls and end walls, said side and said end walls having lower portions and upper portions, means securing said lower portions of said side and said end walls together, other portions depending from said upper portions of said side walls, said lower portions of said side and said end walls extending upwardly in a generally vertical plane with respect to said bottom wall to form a box-like receptacle;

said upper portions of said side and end walls and said other portions having two conditions, the first condition being with said upper portions and said other portions disposed parallel to said bottom wall and forming an enclosure, said package of pet litter material being received within the enclosure in the first condition, the second condition being with said upper portions of said side walls and said upper portions of said end walls angling inwardly towards each other and said other portions angling downwardly and inwardly towards each other, and means interconnecting said other portions of said side walls with said upper portions of said end walls in a selectively assembled relationship, said interconnecting means including said upper portions of said end walls including pairs of slots and said other portions of said side walls including tabs extending within and secured to the slots of said upper portions of said end walls.

8. The kit of claim 7 in which said side walls of said container further include flaps extending outwardly of the upper portions of said side walls and overlapping said upper portions of said end walls.

* * * * *